US012543645B2

(12) United States Patent
Weihl

(10) Patent No.: US 12,543,645 B2
(45) Date of Patent: Feb. 10, 2026

(54) TWO-STAGE MOWING APPARATUS AND METHOD

(71) Applicant: Ricky A. Weihl, Muskegon, MI (US)

(72) Inventor: Ricky A. Weihl, Muskegon, MI (US)

( * ) Notice: Subject to any disclaimer, the term of this patent is extended or adjusted under 35 U.S.C. 154(b) by 18 days.

(21) Appl. No.: 17/089,127

(22) Filed: Nov. 4, 2020

(65) Prior Publication Data

US 2021/0127577 A1    May 6, 2021

Related U.S. Application Data

(60) Provisional application No. 62/930,269, filed on Nov. 4, 2019.

(51) Int. Cl.
| | | |
|---|---|---|
| *A01D 43/08* | (2006.01) | |
| *A01D 34/43* | (2006.01) | |
| *A01D 34/66* | (2006.01) | |
| *A01D 75/30* | (2006.01) | |
| *A01D 101/00* | (2006.01) | |

(52) U.S. Cl.
CPC ........... *A01D 43/08* (2013.01); *A01D 34/435* (2013.01); *A01D 34/66* (2013.01); *A01D 75/303* (2013.01); *A01D 2101/00* (2013.01)

(58) Field of Classification Search
CPC ...... A01D 43/08; A01D 34/485; A01D 34/66; A01D 75/303; A01D 75/306; A01D 75/30; A01D 34/44; A01D 34/005
See application file for complete search history.

(56) References Cited

U.S. PATENT DOCUMENTS

| | | | | |
|---|---|---|---|---|
| 4,510,738 A | * | 4/1985 | Dunn ................... | A01D 34/695 56/12.8 |
| 4,690,224 A | * | 9/1987 | Shwez ................. | A01D 34/435 56/60 |
| 4,737,067 A | * | 4/1988 | Samejima ............... | E02F 3/627 37/403 |
| 5,048,276 A | | 9/1991 | Miller | |
| 5,123,805 A | * | 6/1992 | Ishimori ................ | B62D 49/02 180/908 |

(Continued)

FOREIGN PATENT DOCUMENTS

| | | | |
|---|---|---|---|
| DE | 23 64 657 | 6/1975 | |
| EP | 2997809 A1 * | 3/2016 | ............. A01D 43/06 |

(Continued)

OTHER PUBLICATIONS

Machine Translation of FR2698237 (May 1994) (Year: 1994).*

(Continued)

*Primary Examiner* — Joseph M Rocca
*Assistant Examiner* — Julia C Tran
(74) *Attorney, Agent, or Firm* — Warner Norcross + Judd LLP

(57) ABSTRACT

A system and method according to one embodiment are provided in a vehicle to perform a two-stage cut of grass or other vegetation in a field or lawn. The first stage may be a coarse cut stage, and the second stage may be a finish cut stage. The first and second stages may be conducted by separate cutting configurations. For instance, the first cutting configuration or coarse cutting configuration may be a flail mower configuration, and the second cutting configuration or finish cutting configuration may be a rotary cutting configuration.

20 Claims, 9 Drawing Sheets

(56) References Cited

U.S. PATENT DOCUMENTS

| | | | | |
|---|---|---|---|---|
| 5,343,683 | A * | 9/1994 | Friesen | A01D 34/66 56/13.6 |
| 5,600,943 | A * | 2/1997 | Ryan | A01D 34/661 56/2 |
| 5,806,293 | A * | 9/1998 | Klein | A01D 34/49 172/28 |
| 7,987,917 | B1 * | 8/2011 | Kornecki | A01B 29/02 172/554 |
| 2010/0186361 | A1 * | 7/2010 | Bryant | A01D 34/58 56/11.9 |
| 2011/0203816 | A1 * | 8/2011 | Hurley | A01B 45/02 172/21 |
| 2015/0296708 | A1 * | 10/2015 | Mello | A01D 34/661 56/13.6 |
| 2018/0064030 | A1 * | 3/2018 | Hoppel | A01D 42/00 |
| 2018/0249629 | A1 * | 9/2018 | Weihl | A01D 34/66 |
| 2018/0255708 | A1 * | 9/2018 | Berglund | A01D 43/077 |

FOREIGN PATENT DOCUMENTS

| | | | | | |
|---|---|---|---|---|---|
| FR | 2698237 | A1 * | 5/1994 | | A01D 34/435 |
| GB | 2473634 | A * | 3/2011 | | A01D 34/66 |

OTHER PUBLICATIONS

Machine Translation of EP2997809 (Mar. 2016) (Year: 2016).*
Reelmaster Series, Large Area Reel Mowers with EdgeSeries Reels; brochure published by the Toro Company, Bloomington, Minnesota, 2018.

* cited by examiner

TWO-STAGE MOWING APPARATUS AND METHOD

FIELD OF THE INVENTION

The present disclosure relates generally to a vehicle adapted to cut vegetation, and more particularly to a vehicle configured to mow a lawn with a two-stage cutting system.

BACKGROUND

Yard and field maintenance often involves the use of several different machines, including a conventional lawn mower vehicle to cut grass or other vegetation. In some cases, where vegetation is thick, overgrown, or tall, a conventional mower deck with a finishing blade setup may be considered insufficient to perform adequate maintenance. Conventionally, to achieve adequate maintenance in such cases, more than one vehicle is used. Alternatively, maintenance may be left incomplete with the use of a single vehicle that is considered incapable of performing a finishing cut of acceptable quality.

For instance, a conventional brush hog may be used to clear thick, overgrown, or tall vegetation in a field. The rotary blades on a conventional brush hog are capable of clearing such vegetation but are considered incapable of performing a finishing cut. As a result, a lawn or field on which only a brush hog is used is considered only partially groomed or partially maintained. A second vehicle with a finishing blade setup may follow the conventional brush hog in order to yield more complete maintenance of the field. However, use of a second vehicle or a second pass adds further cost in terms of labor and time, potentially involving two operators or double the amount of time with a single operator for running both vehicles. For this reason, in some cases, only the brush hog may be used in an effort to maintain the field to yield cost effective but only partial maintenance.

SUMMARY

A system and method according to one embodiment are provided in a vehicle to perform a multi-stage cut of grass or other vegetation in a field or lawn. The first stage may be a coarse cut stage, and the second stage may be a finish cut stage. The first and second stages may be conducted by separate cutting configurations. For instance, the first cutting configuration or coarse cutting configuration may be a flail mower configuration, and the second cutting configuration or finish cutting configuration may be a rotary cutting configuration.

In one embodiment, a power mower for operation by an occupant along a ground surface is provided. The power mower may include a frame coupled to a riding platform adapted to support a user, and a plurality of wheels coupled to the frame. The power mower may include a power source having an output shaft operable to transmit power to one or more components of the power mower.

The power mower may include a flail cutter operable to cut plant material, where the flail cutter is operable to move about a first axis substantially parallel to the ground surface. The power mower may also include a secondary cutter operable to receive power from the power source to rotate about a second axis substantially nonparallel to the ground surface, where the secondary cutter is configured to cut plant material. The power mower may include a discharge chute adapted to expel cuttings of plant material generated by the secondary cutter.

In one embodiment, a vehicle operable to maintain a field is provided. The vehicle may include a frame coupled to a riding platform adapted to support a user, and a plurality of wheels coupled to the frame comprising at least two opposing traction wheels. The vehicle may include a power source coupled to the frame.

The vehicle may include a flail mower including a plurality of flails operable to cut vegetation in the field, where the flails are operable to move about a flail axis of the flail mower, and the flail axis is substantially parallel to the field. The vehicle may include a mower deck and a plurality of cutting blades disposed within a cutting space of the mower deck. The plurality of cutting blades may be operable to receive cuttings from the flail mower and to cut the received cuttings. The plurality of cutting blades may be operable to cut vegetation of the field.

The mower deck of the vehicle may include a discharge chute for expelling cuttings.

In one embodiment, a method of cutting vegetation in a field is provided. The method may include rotating a flail cutter about a flail axis that is substantially parallel to a ground surface of the field, and rotating a rotary cutter about a rotational axis that is substantially nonparallel to the ground surface of the field. The method may include cutting, with the rotary cutter, vegetation previously cut by the flail cutter, and discharging the cuttings from the rotary cutter to a discharge chute.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

A system and method according to one embodiment are provided in a vehicle to perform a more than one stage cut of grass, including, for instance, a two-stage cut of grass or other vegetation in a field or lawn. The first stage may be a coarse cut stage, and the second stage may be a finish cut stage. The first and second stages may be conducted by separate cutting implements or configurations. For instance, the first cutting configuration or coarse cutting configuration may be a flail mower configuration, and the second cutting configuration or finish cutting configuration may be a rotary cutting configuration.

In one embodiment, the rotary cutting configuration may include a mower deck with a discharge chute for discharging clippings or debris to a side of the vehicle and/or another area of the vehicle, such as to the rear of the vehicle or to one or more of the cutting stages (e.g., to a flail mower). In one embodiment, the flail mower configuration may include a flail cutter that rotates about an axis that is substantially parallel to the ground surface, and the rotatory mower configuration may include a rotary cutter that rotates about an axis that is substantially nonparallel to the ground surface.

Figure 1:
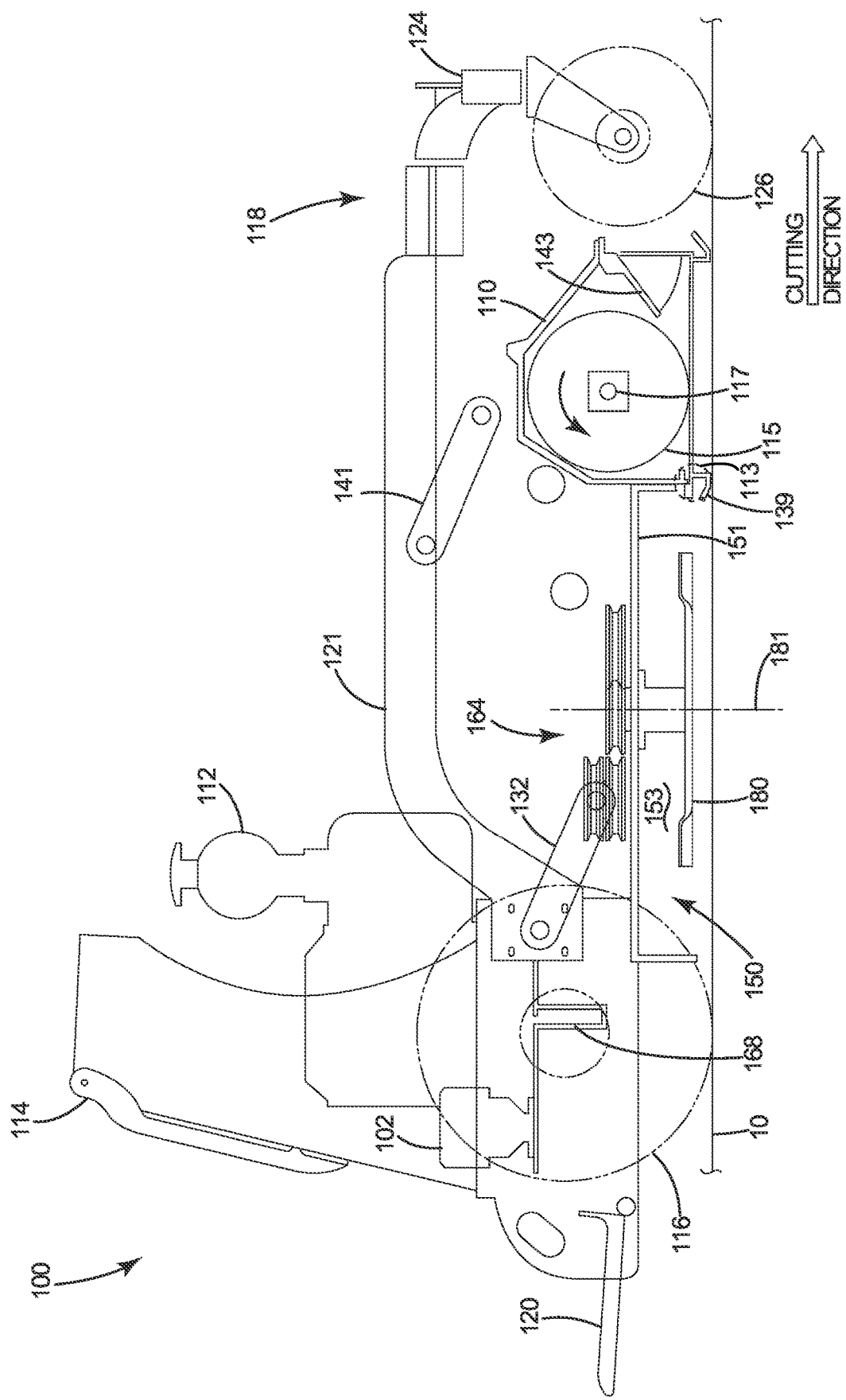
FIG. 1 shows a side view of a vehicle in accordance with one embodiment of the present disclosure.
Figure 2:
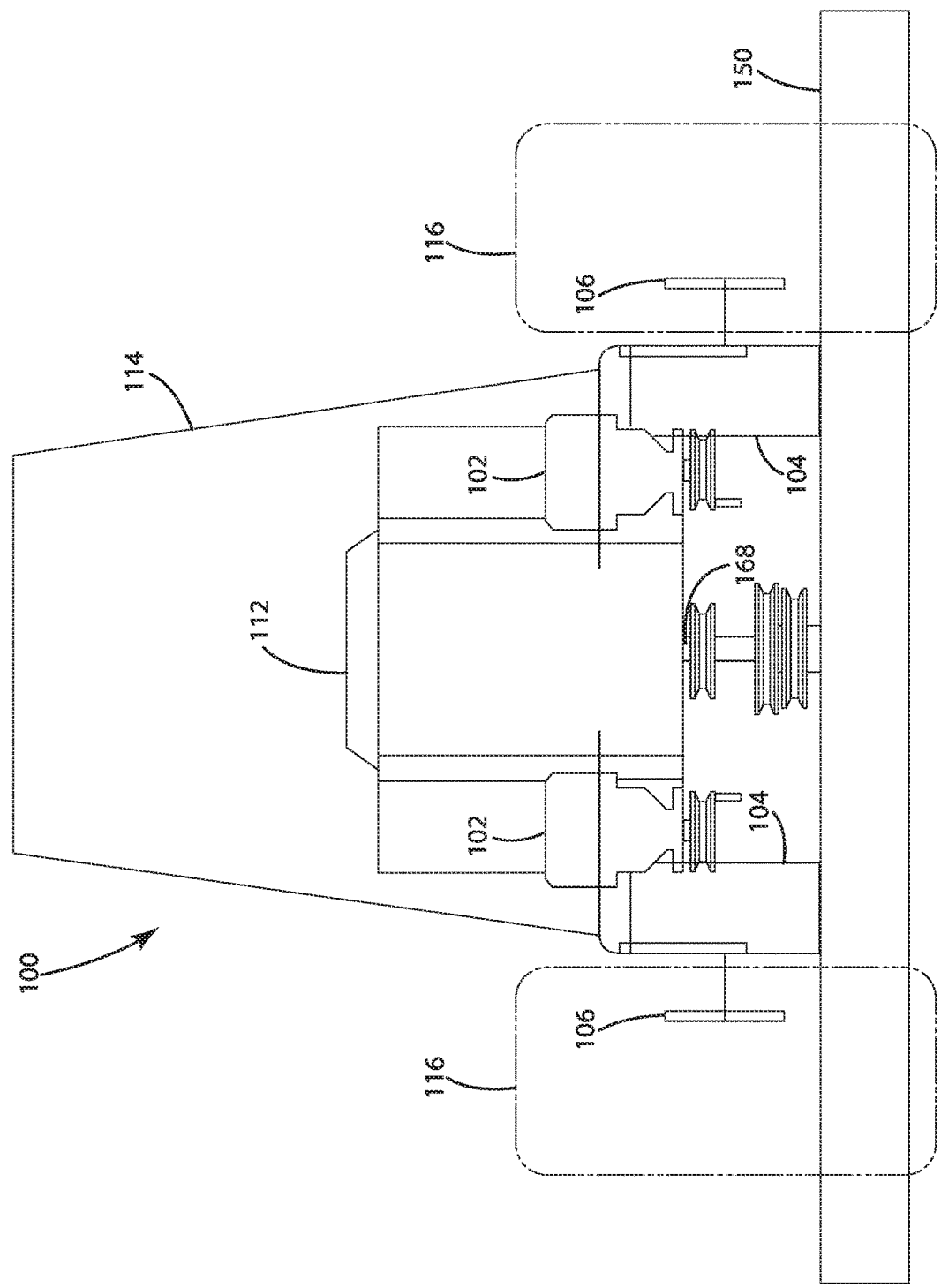
FIG. 2 shows a rear view of the vehicle in FIG. 1.
Figure 3:
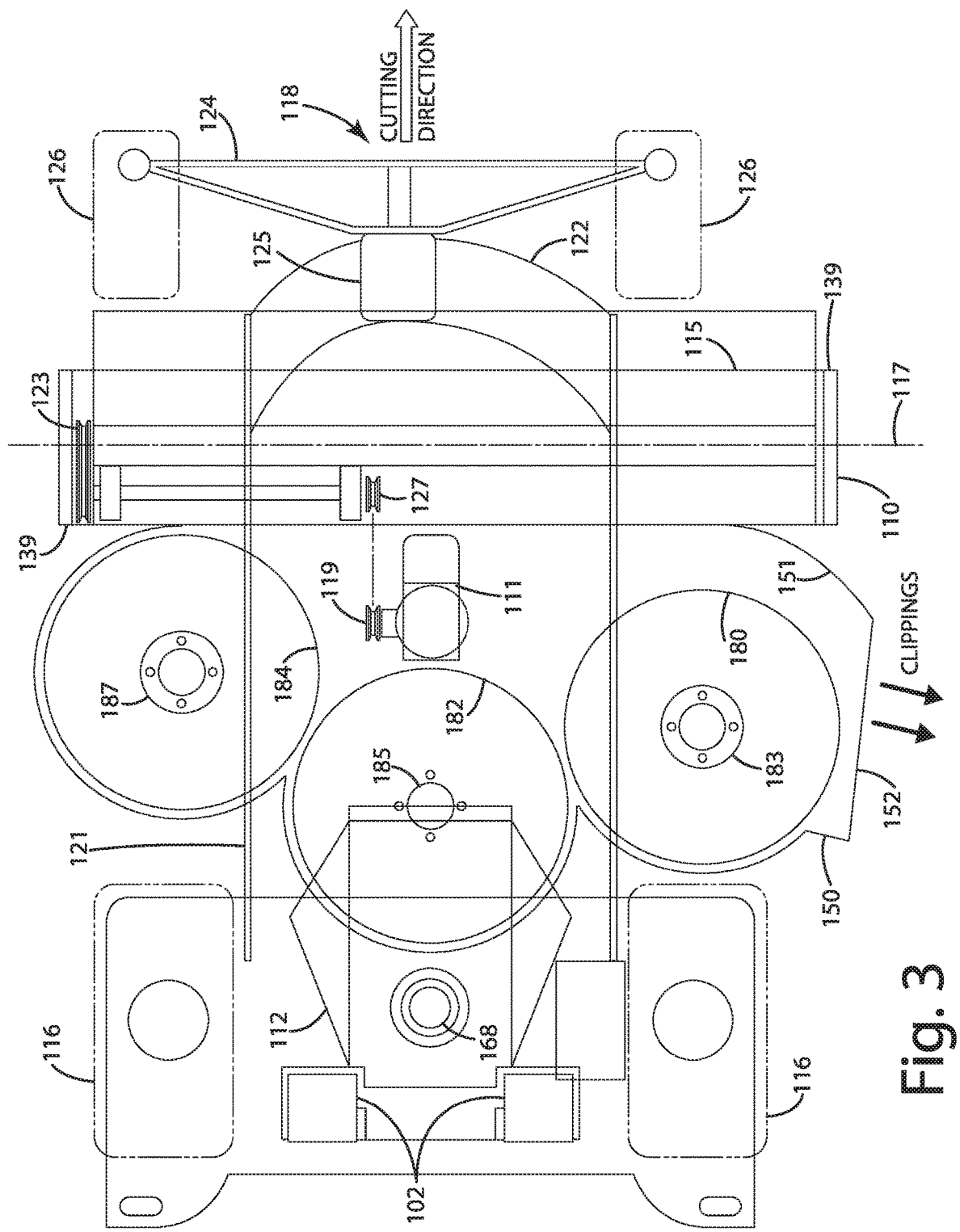
FIG. 3 shows a top view of the vehicle in FIG. 1.

A vehicle according to one embodiment is shown and described in FIGS. 1-3, and generally designated 100. The vehicle may include a flail mower 110, a rotary mower 150, and a power source 112. The flail mower 110 may be the first cutting configuration of a two-stage cut construction, and the rotary mower 150 may be the second cutting configuration of the two-state cut construction. In one embodiment, the flail mower 110 may be operable to cut vegetation that is tall, overgrown, or thick that the rotary mower 150 is not configured for cutting in an adequate manner.

The flail mower 110, as discussed herein, may include a cylinder (e.g., a drum) that rotates about an axis substantially parallel to the ground surface. A plurality of flails may be coupled to the cylinder and spin with the drum about its rotational axis. Each of the flails may include a cutter (e.g., a knife or blade) coupled to the drum in a manner that allows the cutter to move relative to the cylinder in response to contact with a more rigid object. For instance, the cutter of each flail may be coupled to the cylinder via a chain or link that allows pivoting of the cutter relative to the cylinder.

The rotary mower 150, in one embodiment, may include a plurality of cutting blades 180, 182, 184 operable to cut vegetation, such as grass, in a field or lawn. The plurality of cutting blades 180, 182, 184 may be coupled to a power takeoff 168 of the power source 112 via one or more pulleys to facilitate rotational motion. The rotational axis of the plurality of cutting blades 180, 182, 184 in one embodiment is substantially non-parallel with respect to the ground surface 10. As an example, the rotational axis may be vertical relative to the ground surface 10.

Optionally, a blower assembly (not shown) may be configured to direct air to at least one of a) a nozzle external to the rotary mower 150 to facilitate moving debris and b) an internal space of a deck of the rotary mower 150 in order to facilitate discharge of cuttings from the rotary mower 150 to a discharge chute 152.

I. Overview of the Vehicle

In addition to a flail mower 110, a rotary mower 150, and a power source 112, the vehicle 100 may include a frame 121 or primary chassis. The frame 121 may support one or more components of the vehicle 100, including, for example, the power source 112, the flail mower 110 and the rotary mower 150. The vehicle 100 may include at least two traction wheels 116 (e.g., a left wheel and a right wheel) further supported by the frame 121 and configured to drive the vehicle in a forward or reverse direction. In the illustrated embodiment, the vehicle 100 further includes at least two ground-contacting wheels 126 (e.g., one left wheel and one right wheel) that may stabilize the vehicle 100 or facilitate distributing the weight of the vehicle 100 over the ground in conjunction with the at least two traction wheels 116. For instance, the at least two traction wheels 116 and the at least two ground-contacting wheels 126 may be disposed respectively in one of four quadrants defined as rear-left, rear-right, forward-left, and forward-right quadrants with the center of mass of the vehicle 100 being the origin. In this arrangement, the at least two traction wheels 116 and the at least two ground-contacting wheels 126 may distribute the load or weight of the vehicle 100 over the ground, thereby stabilizing the vehicle 100. The at least two ground-contacting wheels 126 in one embodiment may be castor-type wheels that enable zero turning radius (ZTR) capability. It is to be understood that the number of drive wheels (e.g., the least two traction wheels 116) and the number of ground-contacting wheels 126 may vary depending on the application. For instance, the vehicle 100 may include a single ground-contacting wheel 126 or more than two ground-contacting wheels 126.

The at least two traction wheels 116 may be operably coupled to the power source 112 via one or more hydrostatic transmissions, which in conjunction with the power source 112 define a drive system for the vehicle 100. Each of the hydrostatic transmissions may include a pump 102 coupled to the power source 112 and a hydrostatic transaxle 104 capable of independently driving an axle 106 of the at least two traction wheels 116 in forward or reverse directions, and at varying speeds. It should be understood that any type of drive system may be utilized, including, for example, a single dual axle hydrostatic transaxle.

The frame 121 of the vehicle 100 may include a front suspension 118 configured to support the at least two ground-contacting wheels 126 near the front of the vehicle 100. The front suspension 118 may include a front frame element 122 fixedly coupled to the main body of the frame 121, and may include forward control arms 124 that are movably coupled to the front frame element 122. Each end of the forward control arms 124 may support one of the at least two ground-contacting wheels 126. In the illustrated embodiment of FIG. 3, mounting between the forward control arms 124 and the front frame element 122 is facilitated by a joint 125 that enables the forward control arms 124 to rotate relative to the front frame element 122. The joint 125 may be disposed between left and right sides of the vehicle 100 such that the length of the forward control arms 124 is divided substantially evenly at the joint 125 between respective ground-contacting wheels 126. In this way, as the vehicle 100 approaches an uneven surface, the forward control arms 124 may tilt or rotate relative to the frame 121 to facilitate maintaining contact between the ground and at least two ground-contacting wheels 126.

The vehicle 100 may include a platform 120 (e.g., a riding platform) coupled to the frame 121, and arranged to enable an operator to stand while operating the vehicle 100. In the illustrated embodiment, the platform 120 is disposed near the rear of the vehicle 100. The platform 120 may be forward or aft of a rotational axis of rear-located traction wheels. It should be understood that the present disclosure is not limited to a platform 120 arranged to provide stand-up riding capabilities. For instance, the vehicle 100 may be a sit-down type vehicle such that the platform 120 is a seat for supporting the operator while operating the vehicle 100. The seat in such an embodiment may be disposed forward or aft of the power source 112.

In the illustrated embodiment, the vehicle 100 includes an operator control system 114 that provides one or more operator controls for the operator to direct operation of the vehicle 100. As an example, the operator control system 114 may include left and right levers that independently direct forward/reverse operation of respective left and right traction wheels 116. With such independent control over left and right traction wheels 116, the operator can drive the vehicle 100 forward, reverse, left, and right. The operator control system 114 may further include an ignition switch that controls ignition of the vehicle 100 and enablement of an electrical system. The operator control system 114 may be configured to enable/disable operation of the at least two traction wheels 116 based on presence of the operator, and may engage/disengage a brake based on presence of the operator. An example of such a system is described in U.S. patent application Ser. No. 14/633,644, entitled VEHICLE CONTROL SYSTEM, and filed Feb. 27, 2015.

As discussed herein, the present disclosure is not limited to a multi-stage cutting vehicle having a rotary mower 150 and a flail mower 110. In an alternative embodiment, the stage associated with the rotary mower 150 or the flail mower 110, or both, may be replaced with a differently constructed cutting assembly. For instance, the rotary mower 150 may be replaced with one or more reel-type mowers or a secondary flail mower.

Figure 5:
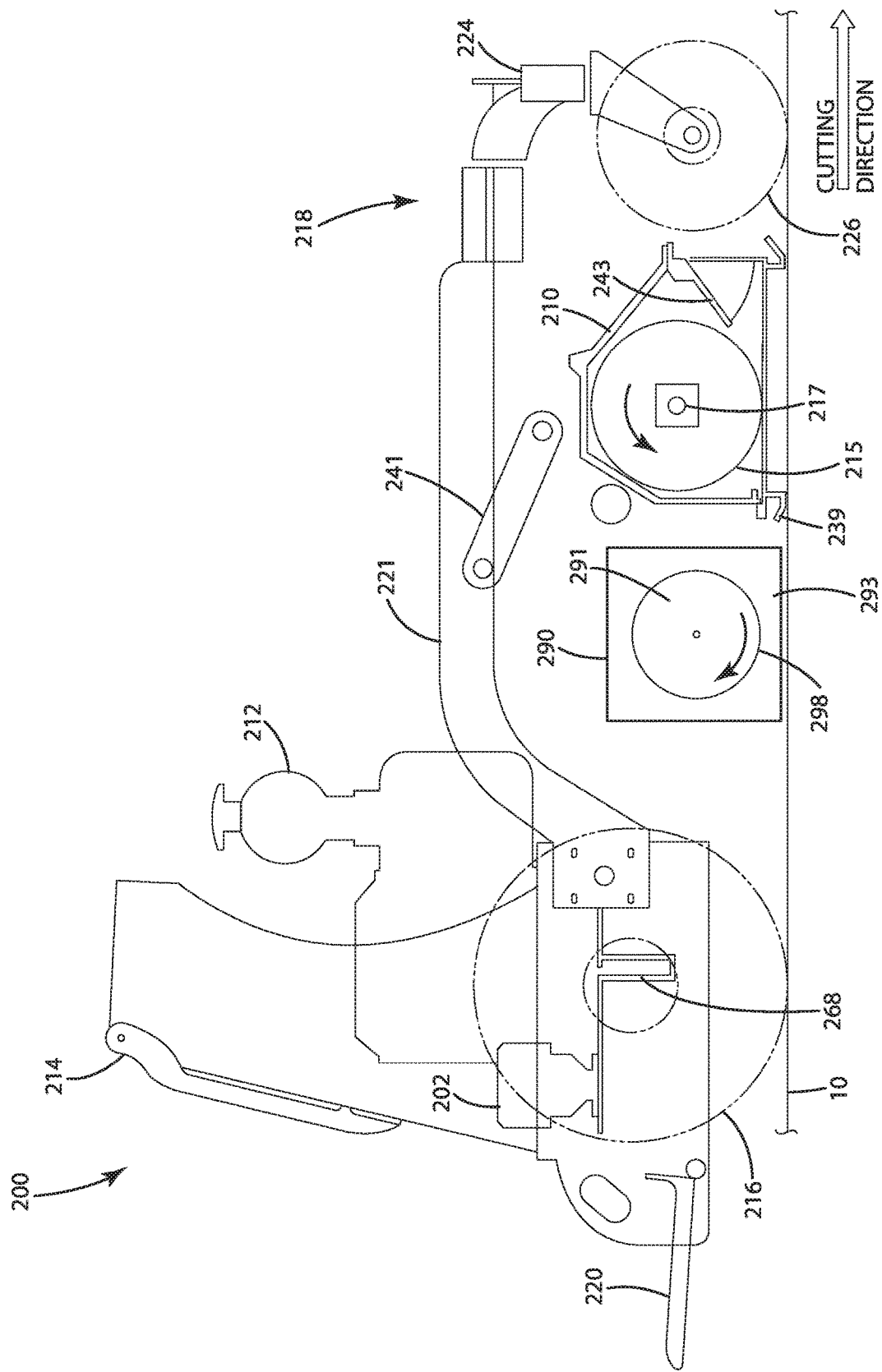
FIG. 5 shows a side view of a vehicle in accordance with an alternative embodiment of the present disclosure.
Figure 6:
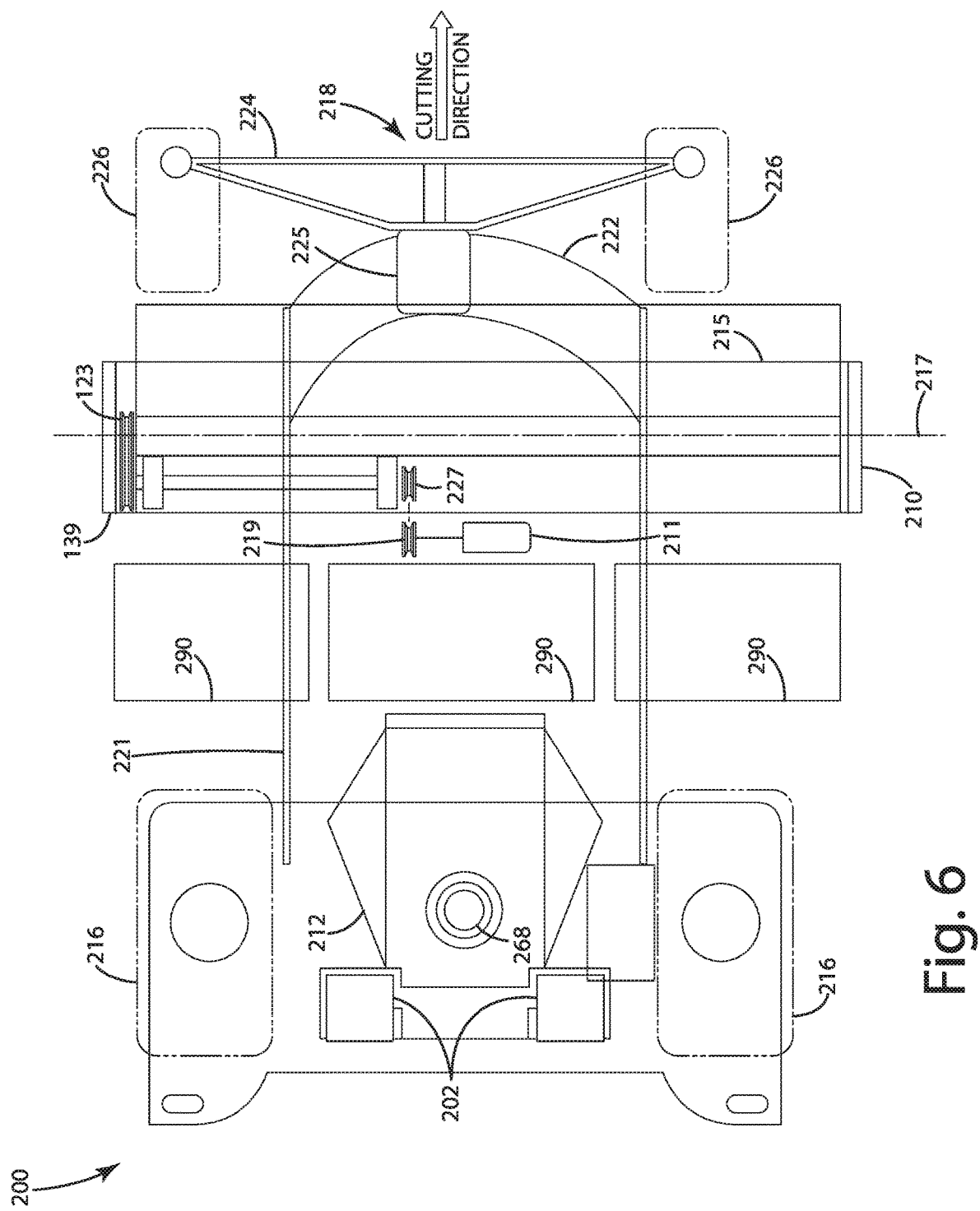
FIG. 6 shows a top view of the vehicle in FIG. 5.

An alternative embodiment of a vehicle in accordance with one embodiment is shown in the illustrated embodiments of FIGS. 5 and 6 and is generally designated 200. The vehicle 200 in the illustrated embodiment is similar to the vehicle 100 described herein but with several exceptions, including having a reel-type mower as a secondary stage aft of a flail mower instead of a rotary mower as the secondary stage provided in the vehicle 100. For purposes of disclosure, components of the vehicle 200 that are similar to a corresponding component of the vehicle 100 are designated using like reference numbers with a leading "2" instead of a leading "1". For instance, the flail mower 210 of the vehicle 200 in the illustrated embodiment of FIGS. 5 and 6 may be similar to the flail mower 110 described in conjunction with the vehicle 100.

The vehicle 200 in the illustrated embodiment of FIGS. 5 and 6 includes one or more secondary stage cutters, designated 290, that are disposed aft of the flail mower 210. A secondary stage cutter 290 may be any type of cutting construction for cutting vegetation on the ground surface 10 or field. For instance, the secondary stage cutter 290 may be a separate flail mower. As another example, as shown in the illustrated embodiment, the secondary stage cutter 290 may be a reel-type mower.

The secondary stage cutter 290 in the illustrated embodiment may include a reel-type cutting blade 298 that rotates about a rotation axis 291 within a cutting space 293 of the secondary stage cutter 290. The rotation axis 291 of the secondary stage cutter 290 may be substantially parallel to the ground, similar to the rotation axis 217 of the flail mower 210. The direction of rotation of the reel-type cutting blade 298 may be in the direction shown in FIG. 5. The reel-type cutting blade 298 may interface with a bedknife to sheer vegetation on the ground as the reel-type cutting blade 298 rotates about the rotation axis 291. Cuttings of the secondary stage cutter 290 may be discharged aft of the secondary stage cutter 290 along the direction of travel, or to another portion of the vehicle 200 as described in connection with the vehicle 100 (including a discharge chute).

Figure 4:
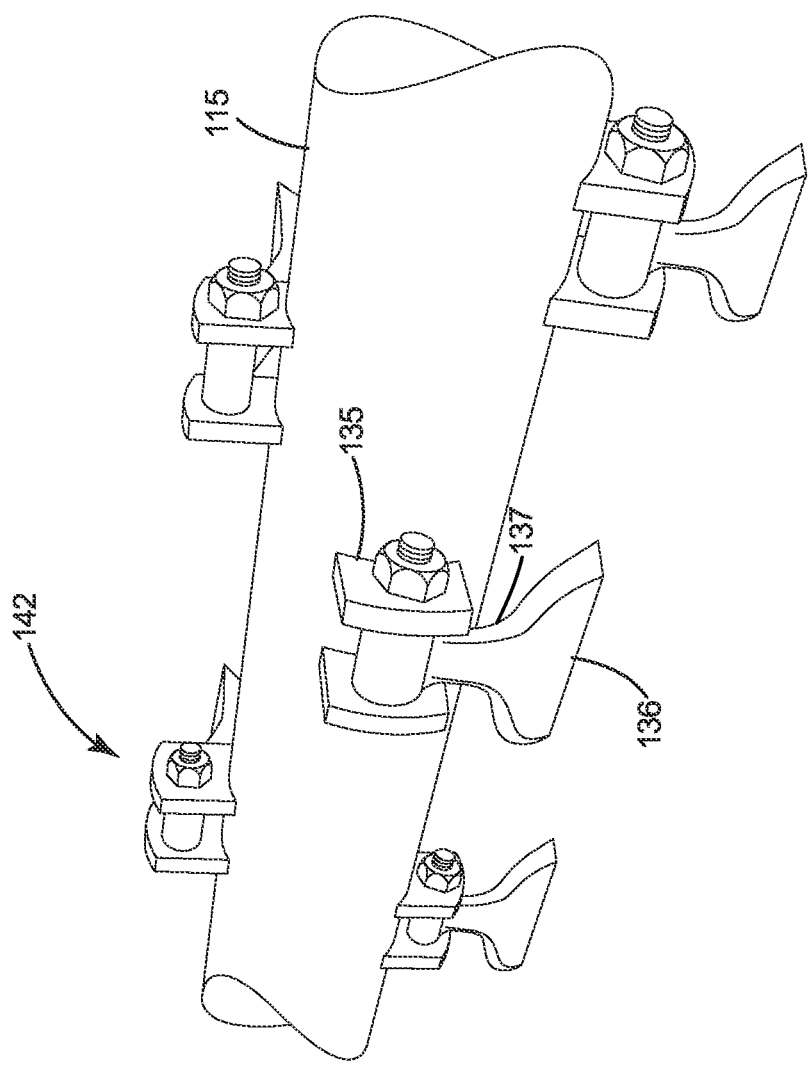
FIG. 4 shows a section of a flail mower in accordance with one embodiment of the present disclosure.

It is noted that the secondary stage cutter 290 in the illustrated embodiment of FIGS. 4 and 5 may be more compact than a rotary mower 150 along the horizontal axis of the vehicle 200. This more compact aspect of the secondary stage cutter 290 may enable shortening of the wheelbase of the vehicle 200, and moving the center of gravity closer to the operator relative to the vehicle 100.

In the illustrated embodiment of FIG. 6, the vehicle 200 includes a plurality of secondary stage cutters 290 disposed adjacent to each other aft of the flail mower 210. More or fewer secondary stage cutters 290 may be provided. For instance, in one embodiment, a single secondary stage cutter 290 may be provided. The plurality of secondary stage cutters 290 may be provided within a single internal cutting space 293, or each of the secondary stage cutters 290 may be provided in its own internal cutting space 293 such that the internal cutting spaces 293 are separate.

The secondary stage cutters 290 in the illustrated embodiment may receive power from the power source 212. In one embodiment, power may be transmitted via one or more belts and pulleys, similar to the belts and pulleys described in conjunction with powering the rotary mower 150 in the vehicle 100. Additionally, or alternatively, the secondary stage cutters 290 may be hydraulically powered. In one embodiment, as described herein, the primary stage cutter (e.g., the flail mower 110, 210) and the secondary stage cutter (e.g., the rotary mower or the reel-type mower) may be disposed between the front wheels and the rear wheels of the vehicle, as depicted in the illustrated embodiments of FIGS. 1-6. It is to be understood that the one or both or another stage cutter may be disposed forward of the front wheels or aft of the rear wheels, or a combination thereof. It is also to be understood that the drive for one or more of the cutting stages may be disposed between, after, and/or before any one or more of the cutting stages. As an example, the vehicle 100 may include from front to back: 1) a forward cutting stage in front of the front wheels, 2) one or more front wheels, 3) a flail mower 110, 210, 4) a drive for the cutting stages, 5) a secondary mower, 6) one or more rear wheels, and 7) a rear cutting stage. The forward cutting stage in this example may be operable to cut down tall vegetation (e.g., tall grass), and the flail mower 110, 210 may be operable to conduct a first cut. The secondary mower may be operable to provide a finish cut, and the rear cutting stage may be operable to provide finished grass. In this example, although there are four cutting stages, the arrangement of the cutting stages relative to the drive and the wheels of the vehicle may provide a center of gravity that provides a target degree of maneuverability as well as an enhanced finish cut. Striping may also be enhanced due at least in part to avoidance of heavy weight drive tire marks, and/or removal of the drive tire marks after the secondary mower by the finishing performed by the rear cutting stage.

Figure 7:
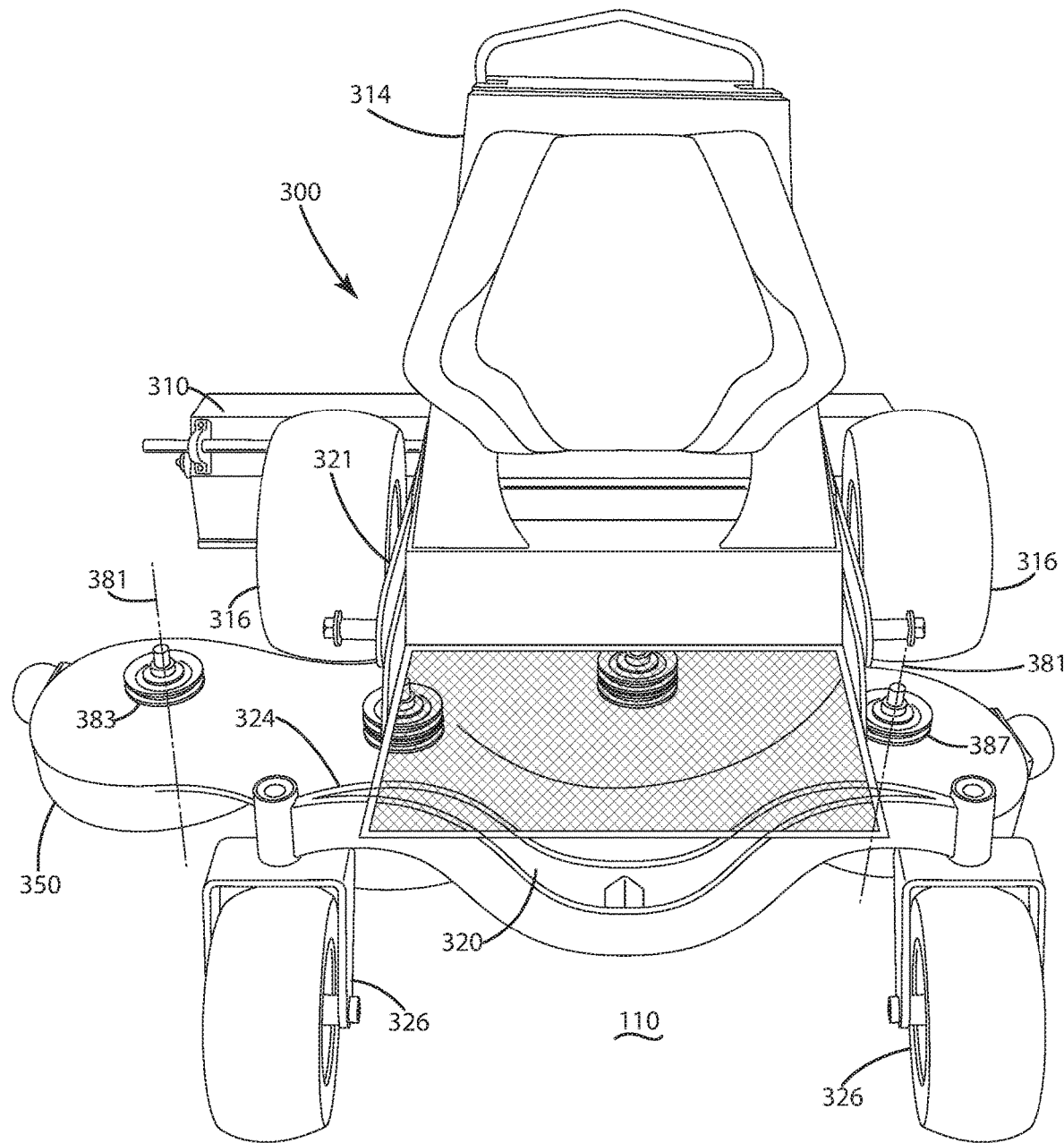
FIG. 7 shows a rear view of the vehicle in accordance with an alternative embodiment of the present disclosure.
Figure 8:
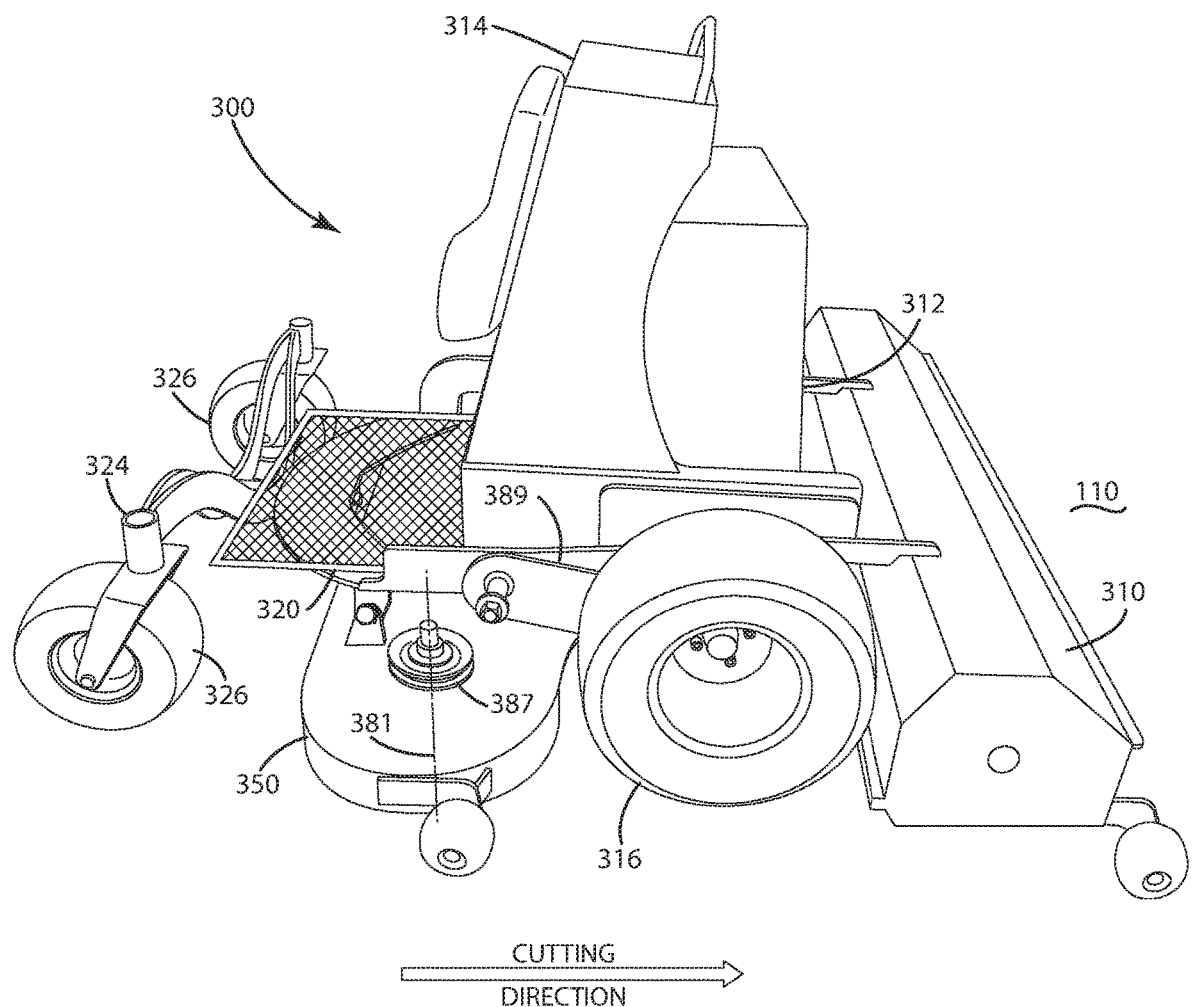
FIG. 8 shows a side view of the vehicle in FIG. 7.
Figure 9:
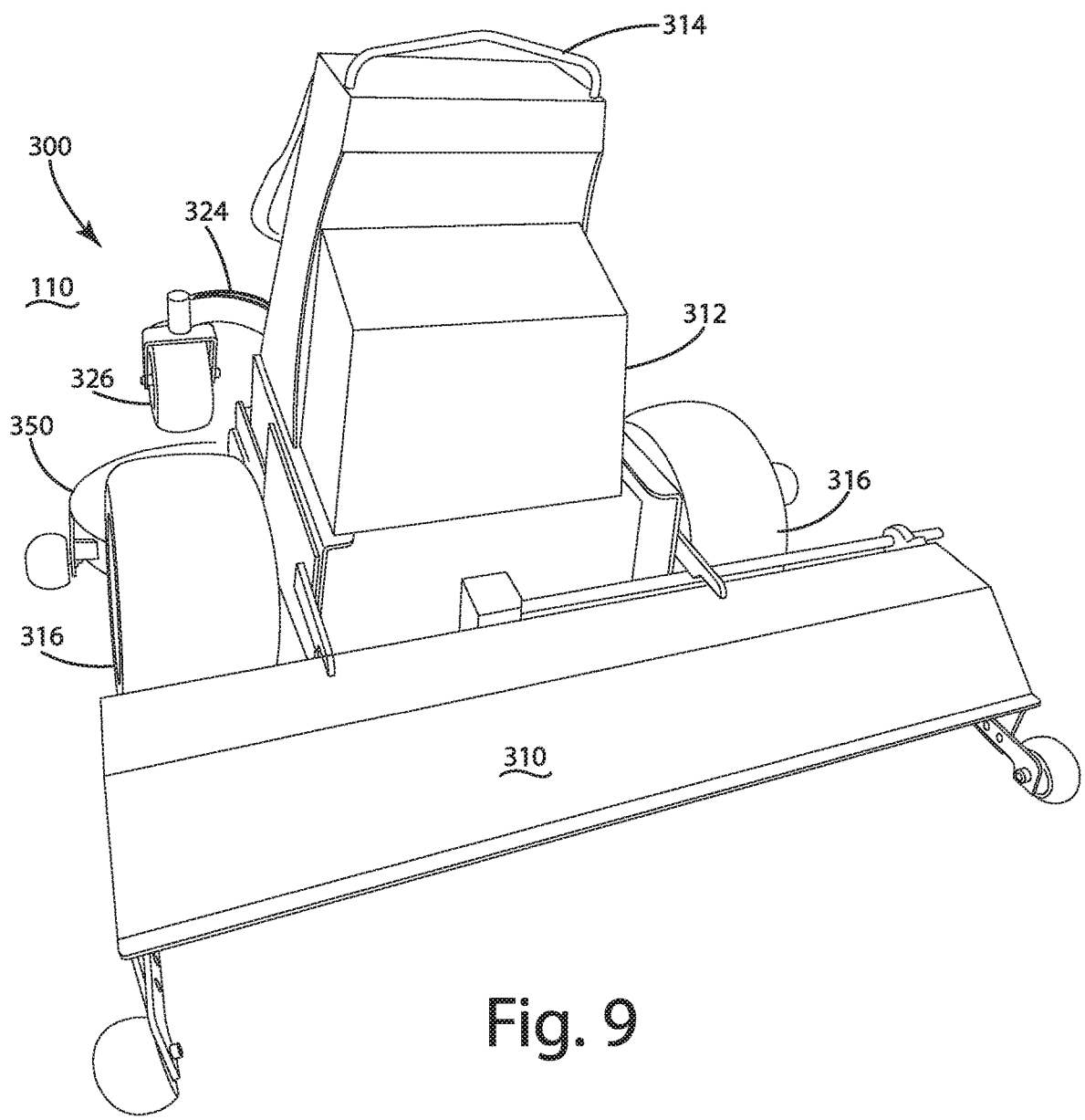
FIG. 9 shows a front perspective view of the vehicle in FIG. 7.

An alternative embodiment of a vehicle in accordance with one embodiment is shown in the illustrated embodiments of FIGS. 7-9 and is generally designated 300. The vehicle 300 in the illustrated embodiment is similar to the vehicle 100, 200 described herein but with several exceptions, including having a rotary mower as a secondary stage aft of a flail mower and of one or more wheels of the vehicle 300. For purposes of disclosure, components of the vehicle 300 that are similar to a corresponding component of the vehicle 100 are designated using like reference numbers with a leading "3" instead of a leading "1". For instance, the flail mower 310 of the vehicle 300 in the illustrated embodiment of FIGS. 7-9 may be similar to the flail mower 310 described in conjunction with the vehicle 100. Components labeled in this manner are not necessarily identical to each other. For instance, the structures of the frame 121 and the frame 321 are different from each other; however, the frame 121 and the frame 321 serve a similar function such as to support one or more additional aspects of the vehicles 100, 300.

The vehicle 300 in the illustrated embodiment of FIGS. 7-9 includes a secondary stage cutter, identified as a rotary mower and designated 350, that is disposed aft of the flail mower 310. The secondary stage cutter may be any type of cutting construction for cutting vegetation on the ground surface 10 or field. For instance, the secondary stage cutter may be a separate flail mower or a reel-type mower. As another example, as shown in the illustrated embodiment, the secondary stage cutter may be rotary mower 350, similar to the rotary mower 150.

The vehicle 300 is configured different from the vehicle 100 in several ways, including the left and right traction wheels 316 being disposed forward of the at least two ground contacting wheels 326 relative to the primary direction of travel. In other words, the left and right traction wheels 316 lead the vehicle 300 in a front-wheel drive configuration. The left and right traction wheels 316 in the illustrated embodiment are configured for differential steering, such that the speed of each of the left and right traction wheels 316 relative to each is manipulated to control the direction of travel of the vehicle 300. For instance, to make a left turn, instead of the left and right traction wheels 316 being turned toward the left, the speed of the right traction wheel 316 is controlled to be greater than the speed of the left traction wheel 316.

The at least two ground contacting wheels 326 in the illustrated embodiment are provided proximal to the rear of the vehicle 300. The at least two ground contacting wheels 326 may turn relative to the vehicle 300, and optionally independent of each other as shown in the illustrated embodiment. With the at least two ground contacting wheels 326 being operable to turn, and with differential steering provided by the left and right traction wheels 316, the vehicle 300 is capable of zero-degree radius turning or near zero-degree radius turning.

In the illustrated embodiment, the flail mower 310 is disposed forward of the front wheels of the vehicle 300 relative to the primary direction of travel. For instance, the flail mower 310 may be disposed forward of the left and right traction wheels 316.

The rotary mower 350 in the illustrated embodiment is disposed aft of front wheels (e.g., the left and right traction wheels 316) relative to the primary direction of travel. The rotary mower 350 in the illustrated embodiment is also aft of the power source 312. It is to be understood that positioning of the rotary mower 350 is not limited to the location shown in the illustrated embodiment. The rotary mower 350 may be disposed in a variety of positions relative to the vehicle center of gravity, including the position shown with the flail mower 310 forward of the vehicle center of gravity and the rotary mower 350 rear of the vehicle center of gravity. The vehicle operator, in the illustrated embodiment, is provided with a platform 320 that enables the rider to be disposed forward of a rotational axis of the rear wheels (e.g., forward of the at least two ground contacting wheels 326).

In one embodiment, the rotary mower 350, the platform 320, and the power source 312 are disposed between the rotational axes of the rear wheel and the front wheels, with the flail mower 310 being disposed forward of the front wheels. The configuration or aspects thereof may enhance stability of the vehicle 300, and may enable a shorter wheel base relative to the wheel base of the vehicle 100 with both the flail mower 110 and the rotary mower 150 disposed between the front and rear wheels.

The height of the cutting stages of the vehicle 300, individually or collectively, may be varied in a variety of ways depending on the application. In the illustrated embodiment, the vehicle may include a linkage 389 operably coupled between the right traction wheel 316 and the frame 321 of the vehicle 300. The linkage 389 may be controlled by the operated via the operator control system 314, such as by rotating the linkage 389 to raise and lower the right traction wheel 316 relative to the frame 321, thereby raising or lowering the cutting stages of the vehicle 300. A linkage on the other side of the vehicle 300 that is similar to the linkage 389 may be provided to couple the frame 321 to the left traction wheel 316. In other words, in the illustrated embodiment, the cutting stages of the vehicle 300 (e.g., the rotary mower 350 and the flail mower 310) may be fixedly coupled to the frame 321, and the height of the cutting stages may be changed by raising and lowering the frame 321 relative to the left and right traction wheels 316 via the linkage 389. Alternatively, the height of the cutting stages of the vehicle 300 may be varied via linkages similar respectively to the linkages 132, 141 such that, for instance, a linkage may be provided to couple the frame 321 to the rotary mower 350 and to enable raising and lowering of the rotary mower 350 relative to the frame 321 and the ground. Likewise, as another example, a linkage may be provided to couple the flail mower 310 to the frame 321 and to enable raising and lowering of the flail mower 310 relative to the frame 321 and the ground.

In the illustrated embodiments, the vehicle 100, 200, 300 is provided with two or more cutting stages, such as a flail mower 110, 210, 310 and a rotary mower 150, 350. The cutting stages, as well as the left and right traction wheels 116, 216, 316, may be powered via the power source 112, 212, 312. Power may be transferred to the cutting stages and the traction wheels in a variety of ways, including via hydraulic transmission, clutches, and belts, or any combination thereof. For instance, the flail mower 110, 210, 310 may be coupled to a hydraulic motor that rotates the flails 142 and that is powered via the power source 112, 212, 312. Likewise, one or more of the cutters of the rotary mower 150, 350 may be coupled to a hydraulic motor that rotate the cutters via power received from the power source 112, 212, 312. The hydraulic motor for the cutters may be operably coupled to the cutters via one or more of belts, pulleys, and clutches.

II. The Rotary Mower

As discussed herein, the rotary mower 150 in one embodiment may include a plurality of cutting blades 180, 182, 184. In the illustrated embodiments of FIGS. 1-3, the cutting blades include a right cutting blade 180, a center cutting blade 182, and a left cutting blade 184, relative to a cutting direction of the rotary mower 150. The rotary mower 150 may include a mower deck 151 that defines an internal space 153 in which the plurality of cutting blades 180, 182, 184 are positioned. The internal space 153 may facilitate performing a finishing cut with the plurality of cutting blades 180, 182, 184. The cutting blades 180, 182, 184 may rotate about a rotational axis 181 that is substantially nonparallel to the ground surface 10. For instance, the rotational axis 181 may be vertical (as depicted), 45°, or 15° relative to the ground surface 10.

In the illustrated embodiment, the mower deck 151 may be coupled to the frame 121 of the vehicle 100 such that a forward direction of the vehicle 100 corresponds to the cutting direction of the rotary mower 150. The height of the mower deck 151 relative to the ground may be changed by control arms 132 coupled to the mower deck 151 and under control of an actuator (not shown) that can be operated by the operator control system 114. The actuator may be a mechanical lever assembly capable of allowing the operator to translate mechanical motion to a height change in the mower deck 151. Alternatively, the actuator may be at least partially powered to facilitate changing a position of the control arms 132 in order to change a height of the mower deck 151.

It is noted that the cutting action of each cutting blade 180, 182, 184 includes at least two types of cuts: a coarse cut and a finish cut. The forward cutting space of each cutting blade 180, 182, 184, or the position of the cutting blade that makes the first cut as the mower deck 151 travels in the cutting direction, may perform the coarse cut. This first cut or coarse cut may occur after grass blades of the lawn have just cleared a front edge of the mower deck 151, which may push down the grass blades as they travel under the front edge. Because the grass blades may not be completely upright at this stage, the cutting blade may cut the grass blades above a desired cut height. As the mower deck 151 continues to travel in the cutting direction, the grass blades enter the rear cutting space of each cutting blade 180, 182, 184. In this rear cutting space, the cutting blade may perform the finish cut. The rear cutting space may be proximate the position of the blade as it travels near the rear edge of the mower deck 151 (or a possible baffle). It should be understood that not all blades of grass that encounter the rotary mower 150 enter the forward cutting space and the rear cutting space for the same duration. For example, for a given vehicle speed, blades of grass positioned left or right of a rotational axis of the cutting blades (relative to the cutting direction) may enter the forward and rear cutting spaces for a length of time that is shorter than that associated with blades of grass positioned closer to the rotational axis. In an attempt to offset the effects of this difference in time, the front edge of the mower deck 151 may be spaced from the cutting blades to enable blades of grass positioned farther away from the rotational axis additional time to return to an upright position. This additional time may enable the length of the coarse cut to be closer to or in fact the same as a finish cut.

Although the rotary mower 150 is operable to conduct coarse and finish cuts, it is noted herein that the two-stage cutting action of the vehicle 100 in the illustrated embodiment includes the cutting action conducted by separate cutting systems, such as the flail mower 110 as the first stage and the rotary mower 150 as the second stage. The flail mower 110 in the illustrated embodiment may perform a coarse cut, and the rotary mower 150 may perform a finish cut. The coarse cut performed by the rotary mower 150 is considered less effective for achieving a quality finish cut with the rotary mower 150 in cases where vegetation is thick, overgrown, or large. The coarse cut performed by the flail mower 110, as discussed herein, is capable of cutting such thick, overgrown, or large vegetation to prepare the field or lawn for the rotary mower 150 to ultimately perform a finish cut that is considered acceptable. It is noted that the two-part cutting action of the rotary mower 150—i.e., the coarse cut and the finish cut—are considered to form part of the rotary cutting stage within the multi-stage cutting action described herein in accordance with one embodiment of the present disclosure.

The rear cutting space of the plurality of cutting blades 180, 182, 184 and the rear edge of the mower deck 151 may be arranged to be in closer proximity to each other than the proximity between the front edge and the forward cutting space. In the illustrated embodiment, the rear edge of the mower deck 151 (or baffle) is spaced substantially evenly from the rear cutting space of the respective cutting blades 180, 182, 184. This spacing may be between ⅛ inch and 2 inches, or between ⅛ inch and ½ inch, or approximately ⁵⁄₁₆ inch. In maintaining proximity between the rear edge and the rear cutting space, a vacuum may be generated in the rear cutting space that facilitates positioning blades of grass in an upright position for the finish cut.

In the illustrated embodiment of FIG. 3, the plurality of cutting blades 180, 182, 184 are arranged in a reverse delta configuration in which a right blade 180 and a left blade 184 are disposed forward of a center blade 182 in a 'V' arrangement with respect to the cutting direction of the rotary mower 150. In this configuration, the rear cutting spaces of the center blade 182, the right blade 180, and the left blade 184 can be disposed approximately the same distance from the rear edge of the mower deck 151. As discussed herein, close proximity with respect to the rear cutting space and the rear edge may facilitate generation of a vacuum in the rear cutting space for the finish cut. Although the plurality of cutting blades 180, 182, 184 are disposed in a reverse delta configuration in the illustrated embodiment, it should be understood that the present disclosure is not so limited. For instance, the plurality of cutting blades 180, 182, 184 may be arranged in a delta configuration (e.g., in a '∧' arrangement) in which the center blade 182 is forward of the right blade 180 and the left blade 184 with respect to the cutting direction of the mower deck 151. It is noted that in the delta configuration, the distance between the rear cutting space of the center cutting blade 182 and the rear edge may be greater than the distance between the rear cutting spaces of the left and right cutting blades 180, 184 and the rear edge. This difference in spacing may yield less vacuum in rear cutting space of the center blade 182 in the delta configuration, and for this reason, the cutting action of the reverse delta configuration may in some cases be cleaner than the delta configuration.

In one embodiment, one or more baffles may be incorporated into the cutting space to facilitate generation of a vacuum in the rear cutting space of one or more cutting blades 180, 182, 184. A baffle, for instance, may be disposed proximate to a rear cutting space of the center blade 182 in the delta configuration. This baffle configuration may help the center blade 182 provide a quality finish cut despite being disposed forward of the left and right cutting blades 180, 184.

Another example arrangement of the plurality of cutting blades 180, 182, 184 includes a straight configuration (e.g., in a '-' arrangement) where the rotational axes 181 of the plurality of cutting blades 180, 182, 184 are substantially even with each other relative to the cutting direction. It should further be understood that a rotary mower 150 according to one embodiment of the present disclosure may include a single cutting blade.

The mower deck 151 in the illustrated embodiment may also include a discharge chute 152 through which cuttings generated by the cutting blades 180, 182, 184 can be expelled from the mower deck 151. The discharge chute 152 may be disposed to direct cuttings to any location of the vehicle 100, including the side of the vehicle 100, the rear of the vehicle 100, and to a cutting stage of the vehicle 100 prior to or after the rotary mower 150, including the flail mower 110.

The mower deck 151 includes the internal space 153 within which the cutting blades 180, 182, 184 spin when driven. The mower deck 151 is open along a surface of the lawn or field, and may further define the discharge chute 152 through which cuttings may be expelled from the internal space 153. In one embodiment, the discharge chute 152 may include a chute blocker (not shown) that may be selectively engaged/disengaged by an operator (via an operator control system 114 of the vehicle 100) to respectively enable or substantially prevent cuttings from being expelled through the discharge chute 152. As an example, if an operator determines he is closing in on an area on which he does not desire to throw cuttings, the operator may engage the chute blocker to prevent expulsion of the cuttings in that area. After the operator has maneuvered the vehicle 100 past the area of concern, the operator may disengage the chute blocker to enable expulsion of the cuttings from the internal space 153 of the rotary mower 150.

An example of a rotary mower 150 in accordance with one embodiment is described in U.S. application Ser. No. 16/554,170 entitled VEHICLE WITH DEBRIS BLOWER AND LAWN MOWER, to Weihl, and filed Aug. 28, 2019—the disclosure of which is hereby incorporated by reference in its entirety.

The rotary mower 150 in one embodiment may include more or fewer blades than the three depicted in FIG. 3. For instance, a rotary mower 150 may include 4 or 5 cutting blades. Optionally, the blades of the rotary mower 150 may be disposed in a staggered relationship relative to each other (e.g., one forward, one back, one forward, one back). As another example, the rotary mower may include a single cutting blade.

The rotary mower 150 in the illustrated embodiment includes a mower drive assembly 164 with a plurality of pulleys 183, 185, 187 coupled respectively to the plurality of cutting blades 180, 182, 184. The pulleys 183, 185, 187 may be coupled to the power takeoff 168 via one or more drive belts so that rotation of the power takeoff 168 can be translated to rotational motion of the cutting blades 180, 182, 184. Optionally, a clutch (e.g., an electronic clutch) may be provided in the drive train between the power takeoff 168 and the cutting blades 180, 182, 184, enabling selective rotation of the cutting blades 180, 182, 184.

III. The Flail Mower

The flail mower 110 of the vehicle 100 in accordance with one embodiment is shown in FIGS. 1-3. The flail mower 110, as discussed herein, may include a cylinder 115 that rotates about a flail axis 117. The cylinder 115 may be operably coupled to the power takeoff 168 of the power source 112 via pulleys 119, 127, 123 and associated drive belts and shafts, forming a drive assembly for the flail mower 110. The drive assembly for the cylinder 115 may include a transmission 111 geared for speed and torque conversion for the cylinder 115 relative to the power takeoff 168. For instance, the transmission 111 may increase the amount of torque applied to the cylinder 115, trading off rotational speed. Optionally, the drive assembly may include a clutch (e.g., an electronic clutch) operable to selectively engage rotation of the cylinder 115 of the flail mower 110, such that an operator can control whether the flail mower 110 is operating.

In the illustrated embodiment, the flail axis 117 of the flail mower 110 may be substantially parallel to the ground surface 10. The flail axis 117 may also be perpendicular to a longitudinal axis of the vehicle 100.

The flail mower 110 may include a plurality of flails 142 that spin about the flail axis 117 along with the cylinder 115. The flails 142 may be coupled to the cylinder 115 via a flail mount 135 that is attached to the cylinder 115. The flail 142 may include a flail cutter 136 and a link 137 that is pivotably coupled to the flail mount 135. With this construction, if the flail cutter 136 encounters an obstruction, the flail 142 is capable of pivoting about the flail mount 135 so that the flail cutter 136 avoids significant damage to the contact with the obstruction. In other words, the flail 142 may yield somewhat in response to contact with the obstruction.

In the illustrated embodiment, the flail 142 is shown with the link 137 and the flail cutter 136 in an integral configuration; however, it is to be understood that the flail 142 may be configured differently. For instance, the link 137 may be pivotably coupled to the flail cutter 136 in a chain configuration with one or more links. The link 137 in the illustrated embodiment is coupled to the flail mount 135 via a bolt.

In the illustrated embodiment, the flail mower 110 may be raised or lowered relative to the ground surface 10 by a linkage 141. The linkage 141 may be controlled by the operator via the operator control system 114, similar to the control arm 132 operable to control the height of the rotary mower 150.

The flail mower 110 shown in the illustrated embodiment of FIG. 1 is operable to cut vegetation prior to the rotary mower 150 with the vehicle 100 travelling in the cutting direction of the vehicle 100. The flail mower 110 may be operable to rotate about the flail axis 117 in the direction shown in FIG. 1. Clippings or cuttings from the flail mower 110 may be deposited behind the flail mower 110 prior to entering the internal space 153 of the rotary mower 150, which may both reduce the size of the clippings or cuttings and perform a finish cut to the field or lawn.

Optionally, the flail mower 110 includes a field conditioner operable to lay down the cuttings or clippings from the flail mower 110 prior to entry into the internal space 153 of the rotary mower 150 or prior to being cut further by the rotary mower 150. The field conditioner may include a roller or multiple rollers (capable of rolling at different speeds to prevent damaging the vegetation or earth) disposed between the flail mower 110 and the rotary mower 150. In one embodiment, the flail mower 110 may include one or more skid plates 139 or anti-scalping plates to provide clearance, between the field and the cutting implements of the flail mower 110, that is considered sufficient to avoid damaging the field or performing an unintended cut.

The flail mower 110 in one embodiment may include a gate 143 operable to align vegetation for being cut by the flails 142 of the flail mower 110. The gate 143 may facilitate trapping the cuttings within a cutting space of the flail mower 110 and preventing unwanted discharge of cuttings forward of the cutting direction of the flail mower 110.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A power mower for operation by an occupant along a ground surface, said power mower comprising:
    a frame coupled to a riding platform adapted to support a user;
    a plurality of wheels coupled to the frame, the plurality of wheels including two front wheels that oppose each other and provide traction operable to move the power mower forward along the ground surface, the plurality of wheels including two rear wheels;
    a power source having an output shaft operable to transmit power to one or more components of the power mower;
    a flail cutter operable to cut plant material, the flail cutter operable in a first cutting space to move about a first axis substantially parallel to the ground surface, the flail cutter arranged at a height relative to the ground surface, wherein the first cutting space is defined by a flail cutter housing that includes an upper portion, side portions, and a rear portion so that the flail cutter is at least partially enclosed by the upper portion, the side portions, and the rear portion;
    a secondary cutter operable to receive power from the power source to rotate about a second axis substantially nonparallel to the ground surface, the secondary cutter arranged at a height relative to the ground surface, the secondary cutter configured to cut plant material in a second cutting space, wherein the second cutting space is defined by a secondary cutter housing that is separate from the flail cutter housing, wherein the height of the secondary cutter is adjustable separate from the height of the flail cutter;
    wherein the two front wheels that provide traction are disposed between the flail cutter and the secondary cutter; and
    a discharge chute adapted to expel cuttings of plant material generated by the secondary cutter.

2. The power mower of claim 1 comprising a rotary mower having a mower deck with an internal space, wherein the secondary cutter is positioned within the internal space of the mower deck.

3. The power mower of claim 2 wherein the rotary mower includes a plurality of the secondary cutters.

4. The power mower of claim 3 wherein the plurality of secondary cutters are arranged in a reverse delta configuration.

5. The power mower of claim 1 comprising a flail mower having a cylinder driven by the power source, wherein the flail cutter is coupled to the cylinder.

6. The power mower of claim 5 comprising a plurality of flail cutters coupled to the cylinder.

7. The power mower of claim 6 wherein the plurality of flail cutters are coupled to the cylinder respectively via a flail linkage, wherein the flail linkage is pivotable relative to the cylinder.

8. The power mower of claim 1 wherein the second axis of the secondary cutter is substantially vertical.

9. The power mower of claim 1 comprising a field conditioner operable to lay down cuttings from the flail cutter onto the ground surface prior to being cut again by the secondary cutter.

10. The power mower of claim 1 wherein the flail cutter provides a primary cutting stage for the power mower, and the secondary cutter provides a secondary cutting stage for the power mower.

11. A vehicle operable to maintain a field, said vehicle comprising:
    a frame coupled to a riding platform adapted to support a user;
    a plurality of wheels coupled to the frame, the plurality of wheels including two front wheels that oppose each other and provide traction operable to move the vehicle forward along the field;
    a power source coupled to the frame;
    a flail mower including a plurality of flails operable to cut vegetation in the field, the plurality of flails operable in a first cutting space to move about a flail axis of the flail mower, the flail axis being substantially parallel to the field, the plurality of flails arranged at a height relative to the ground surface, wherein the first cutting space is defined by a flail mower housing that includes an upper portion, side portions, and a rear portion so that the flail mower is at least partially enclosed by the upper portion, the side portions, and the rear portion; and
    a mower deck and a plurality of cutting blades disposed within a cutting space of the mower deck, the plurality of cutting blades operable to receive cuttings from the flail mower and to cut the received cuttings in a second cutting space, the height of the mower deck arranged at a height relative to the ground surface, the plurality of cutting blades operable to cut vegetation of the field, the mower deck having a discharge chute for expelling cuttings, wherein the second cutting space is defined by a mower deck housing that is separate from the flail mower housing, wherein the height of the mower deck is adjustable separate from the height of the plurality of flails,
    wherein the two front wheels that provide traction are disposed between the flail mower and the cutting blades of the mower deck.

12. The vehicle of claim 11 wherein the plurality of cutting blades are arranged in a reverse delta configuration.

13. The vehicle of claim 11 wherein the flail mower includes a cylinder coupled to the power source, the cylinder including a longitudinal axis that defines the flail axis, wherein the cylinder rotates about the flail axis.

14. The vehicle of claim 13 wherein the cylinder includes a plurality of flail mounts each operable to pivotably connect to a flail of the plurality.

15. The vehicle of claim 11 comprising a field conditioner operable to position cuttings from the flail mower for receipt by the mower deck.

16. The vehicle of claim 11 wherein each of the plurality of cutting blades defines, along a cutting direction of the vehicle, a coarse cutting stage and a finish cutting stage with the coarse cutting stage provided forward of the finish cutting stage.

17. The vehicle of claim 16 wherein cuttings from the flail mower are received by the coarse cutting stage of the plurality of cutting blades.

18. A method of cutting vegetation in a field, said method comprising:

providing a flail cutter in a first cutting space that is defined by a first cutter housing, wherein the first cutter housing includes an upper portion, side portions, and a rear portion so that the flail cutter is at least partially enclosed by the upper portion, the side portions, and the rear portion, wherein the flail cutter is arranged at a height relative to a ground surface of the field;

rotating the flail cutter about a flail axis that is substantially parallel to a ground surface of the field;

providing a rotary cutter in a second cutting space that is defined by a second cutter housing, wherein the second cutter housing is separate from the first cutter housing, wherein the rotary cutter is arranged at a height relative to the ground surface of the field;

providing two rear wheels and two front wheels forward of the two rear wheels and between the flail cutter and the rotary cutter;

driving the two front wheels to move the flail cutter and the rotary cutter forward relative to the field;

adjusting the height of the rotary cutter separate from the height of the flail cutter;

adjusting the height of the flail cutter separate from the height of the rotary cutter;

rotating the rotary cutter about a rotational axis that is substantially nonparallel to the ground surface of the field;

cutting, with the rotary cutter, vegetation previously cut by the flail cutter; and discharging cuttings from the rotary cutter to a discharge chute.

19. The method of claim 18 comprising conditioning vegetation cut by the flail cutter prior to being cut by the rotary cutter.

20. The method of claim 18 wherein said cutting with the rotary cutter comprising cutting vegetation cut by the flail cutter and cutting vegetation of the field.

* * * * *